United States Patent

Maruyama et al.

[11] Patent Number: 5,827,593
[45] Date of Patent: Oct. 27, 1998

[54] DISC SUBSTRATE USED FOR AN OPTICAL DISC AND A MOLDING DIE FOR MOLDING THE SAME

[75] Inventors: Haruhisa Maruyama; Masaaki Motokawa; Shinichi Hanzawa, all of Yamanashi, Japan

[73] Assignees: Pioneer Electronic Corporation, Tokyo; Pioneer Video Corporation, Yamanashi, both of Japan

[21] Appl. No.: 766,362

[22] Filed: Dec. 17, 1996

[30] Foreign Application Priority Data

Dec. 22, 1995 [JP] Japan .................................. 7-350106

[51] Int. Cl.$^6$ ...................................................... B32B 3/00
[52] U.S. Cl. ...................... 428/64.1; 428/64.2; 428/64.4; 428/65.2; 428/913; 425/549; 369/275.4
[58] Field of Search .................................. 428/64.1, 64.2, 428/64.4, 64.7, 65.2, 913; 264/106, 107; 425/549, 810; 369/275.1, 275.4

[56] References Cited

U.S. PATENT DOCUMENTS

| | | | |
|---|---|---|---|
| 5,059,473 | 10/1991 | Takahashi et al. | 428/162 |
| 5,092,759 | 3/1992 | Lichtinger et al. | 425/546 |
| 5,460,763 | 10/1995 | Asai et al. | 264/107 |
| 5,476,700 | 12/1995 | Asai et al. | 428/66.6 |

*Primary Examiner*—Elizabeth Evans
*Attorney, Agent, or Firm*—Fish & Richardson, P.C.

[57] ABSTRACT

A disc substrate inject-molded comprises; a first circular surface having an inner non-data region formed around a center hole thereof and an outer data region formed around the non-data region; a second circular flat surface opposite and parallel to the first circular surface; and a ring shaped stack-rib formed on the non-data region.

5 Claims, 4 Drawing Sheets

READING SIDE

DISC SUBSTRATE USED FOR AN OPTICAL DISC AND A MOLDING DIE FOR MOLDING THE SAME

BACKGROUND OF THE INVENTION

1. Field of the Invention

The present invention is related to a disc substrate used for an optical disc in which a protective stack-rib is provided to preventing its signal-recorded surface from being damaged, and particularly to a molding die for molding the same. It is also related to an optical disc comprising the disc substrate.

2. Description of the Related Art

There is known a conventional optical disc of read-only such as a video disc, a compact disc or the like.

FIG. 3 shows a cross-sectional view of a conventional single-sided optical disc of a pasted type. In FIG. 3, the numeral 20 denotes a first disc substrate for carrying the information signal which comprises a light-transmissible substrate 21 with a signal-recorded surface carrying pits corresponding to the signal to be recorded and a reflective layer 22 made of a metal thin film covering the signal-recorded surface. A protective layer 23 made of an V-radiation-curable resin is formed at a predetermined thickness on the reflective layer 22. In addition, the numeral 24 denotes a second disc substrate with a dummy signal-recorded surface which carries dummy pits corresponding to dummy signals, which has a similar structure to the first disc substrate 20. These first and second disc substrates 20 and 24 pasted with an adhesive such as the hot melt adhesive or the like in such a manner that both the protective layers 23 sandwich an adhesive layer 25, so that the pasted type optical disc is fabricated.

From the pasted type optical disc above mentioned, the recorded information signal is reproduced in a way that a laser beam is irradiated onto through the light-transmissible substrate 21 to the signal-recorded surface of the first disc substrate.

The disc substrate is provided with a stack-rib 41 for protecting its surface against a possible contact to another substrate in the case of stacked condition of the substrates in order to prevent its signal-recorded surface from being damaged. The stack-rib 41 is a circular protrusion formed on the opposite side of the signal-recorded surface of the disc substrate.

FIG. 4 shows a cross-sectional view an injection molding die for molding the disc substrate above mentioned. A process of the injection molding and the structure of the die will be briefly described below in view of FIG. 4.

As shown in FIG. 4, a movable molding die half 1 comprises a movable mirror face plate 2, an outer circumference holding ring 3, an inner circumference holding ring 5 and a cut-punch 6. The movable mirror face plate 2 is loaded with a stamper 4 on the surface of which a predetermined information pattern is formed. The internal circumference edge of the stamper 4 is locked by an inner circumference holding ring 5, and the outer circumference edge is locked by an outer circumference holding ring 3.

On the other hand, a fixed molding die half 7 comprises a fixed mirror face plate 8, a fixed bushing 10 and a sprue bushing 9. The fixed mirror face plate 8 is provided at the inner circumference edge portion with a circular groove 11 to form the stack-rib of the disc substrate.

In the mold-closed status of the injection molding die, a heated molten material is injected through the sprue bushing 9 into the cavity 12 by the injection molding device (not shown) connected to the bushing so that the molten material flows from the central portion towards the outer peripheral in the cavity 12.

When the molten material is cooled, the information pattern formed on the surface of the stamper 4 is transferred to the surface of a disc substrate. After that, the injection molding die is mold-opened and then the disc substrate of products is removed from the die. The disc substrates removed are heaped in turn. In this time, the signal-recorded surface with the information pattern of the disc substrate is not directly contacted to a work base or another disc substrate by means of the stack-rib. In this way, the signal-recorded surface of the disc substrate is protected from being damaged.

In the pasted type optical disc, a paper label seal on which the designations for contents recorded data are printed is adhered around the center hole of the disc in the non-data region thereof. Since the diameter of the disc becomes small as a digital video disc, the sufficient designation of the contents is difficult.

If the direct printing such a designation on the dummy disc substrate will be performed the dummy signal then the foregoing stack-rib obstructs the direct printing to restrict the printable area and the kind of printing machine.

SUMMARY OF THE INVENTION

Thus, the present invention has been made to solve such a problem in view of the forgoing status. It is therefore an object of the present invention is to provide a disc substrate with the stack-rib having a sufficient printable area in which the kind of printing machine is not restricted for the direct printing. Another object of the present invention is to provide a molding die for molding the same. Further another object of the present invention is to provide a pasted type optical disc comprising such a disc substrate.

The object is achieved by a disc substrate according to the first aspect of the invention. The disc substrate inject-molded comprises; a first circular surface having an inner non-data region formed around a center hole thereof and an outer data region formed around said non-data region; a second circular flat surface opposite and parallel to said first circular surface; and a ring shaped stack-rib formed on said non-data region.

In the second aspect of the invention, a disc substrate molding die comprises; a pair of molding die halves each having a circular molding surface for defining a disc cavity by facing each other in a mold-clamped status thereof; an inner circumference holding ring with a holding edge for holding an inner circumference edge of a stamper formed on the molding surface of one of said molding die halves; an injection-means for injecting a molten material into a center of the disc cavity; a cutting-means for cutting a hardened material disposed inside of the holding ring adjacent to the center of the disc cavity; and a circular groove for forming a stack-rib formed on the one of said molding die halves between the holding edge and the cutting-means.

In the third aspect of the invention, an optical disc comprises; a first disc substrate inject-molded of a transparent material through which a light beam is irradiated; a second disc substrate inject-molded comprising; a first circular surface having an inner non-data region formed around a center hole thereof and an outer data region formed around said non-data region; a second circular flat surface opposite and parallel to said first circular surface; and a ring shaped stack-rib formed on said non-data region, wherein said first circular flat surface is adhered via an adhesive layer to the first disc substrate; and a printed region formed on the second circular flat surface of the second disc substrate.

In the fourth aspect of the invention, the optical disc further comprises a first signal-recorded surface formed on the first disc substrate at the adhered side to the adhesive layer.

In the fifth aspect of the invention, the optical disc further comprises a second signal-recorded surface having a high reflectivity for an incident light being formed on the first circular surface of the second disc substrate; characterized by the first signal-recorded surface having a semitransparency for the incident light which partially reflects and transmits the incident light; and characterized by the adhesive layer having a transparency for the incident light, whereby a recorded signal is read on the basis of a reflected light from an optical spot on the first or second signal-recorded surface of the converged incident light beam irradiated through the first disc substrate.

According to the invention, the disc substrate having the inner non-data region and the outer data region features the non-data region having the stack-rib and the opposite side surface being flat, so that each signal-recorded surface of the stacked disc substrates do not suffer any damage and each can obtain at the flat surface a large area of the printed region being readily printed without any restrict of the kind of the printing machine.

The above set forth and other features of the invention will be made more apparent in the ensuing description of the preferred embodiments when read in conjunction with the attached Drawings.

DESCRIPTION OF THE PREFERRED EMBODIMENTS

Figure 1:
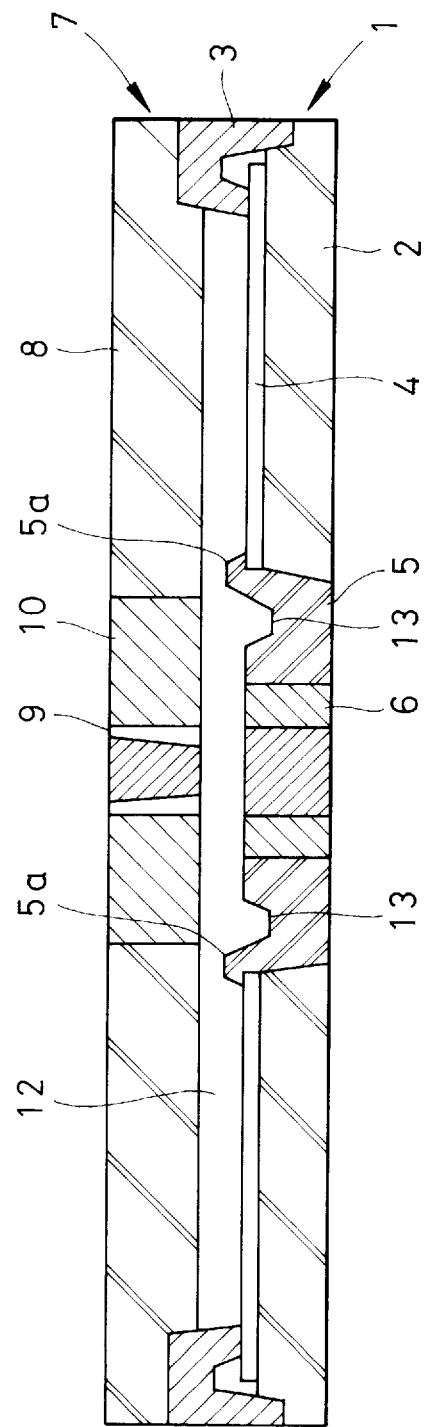
FIG. 1 is a cross-sectional view showing an injection molding die of an embodiment according to the invention.

An injection molding die of an embodiment according to the invention is shown in FIG. 1 as its cross-sectional view. Here, the parts of the embodiment being the same as those of the prior art are denoted by the same numerals. In FIG. 1, a movable molding die half 1 comprises a disc-shaped movable mirror face plate 2 at an outer portion; an outer circumference holding ring 3 at the most outer portion; and an inner circumference holding ring 5 at an inner portion each surface being performed with the mirror-surface treatment. The movable mirror face plate 2 is loaded with a circular plate or stamper 4 on the surface of which a predetermined information pattern is formed as a pit train. The internal circumference edge of the stamper 4 is locked by the inner circumference holding ring 5, and the outer circumference edge is locked by an outer circumference holding ring 3. A cut-punch 6 is disposed at the center of the inner circumference holding ring 5, which cuts out the unnecessary portion of the hardened material in cooperation with a fixed bushing 10.

It should be noted that a circular groove 13 is formed between a holding edge 5a of the inner circumference holding ring 5 and a cut-punch 6 in order to mold and form a stack-rib in a first circular surface of a resultant product.

On the other hand, a fixed molding die half 7 comprises; a fixed mirror face plate 8 disc-shaped being performed with the mirror-surface treatment for defining a second circular surface of a resultant product at an outer portion; a fixed bushing 10 disposed at an inner portion; and a sprue bushing 9 with a hollow structure disposed at the center of the fixed mirror face plate 8. The outer edge of the fixed bushing 10 serves as a cutter blade or cutting-means in cooperation with the cut-punch 6 for removing the unnecessary portion of the hardened material.

The difference between this injection molding die and the conventional shown in FIG. 5 are one that there is removed the circular groove 11 for the stack-rib 41 formed on the molding surface the fixed mirror face plate 8 so that the molding surface of the fixed mirror face plate 8 is entirely flat, and the other that the circular groove 13 is formed between the holding edge 5a of the inner circumference holding ring 5 and the cut-punch 6 for forming the stack-rib in the molding surface including the movable mirror face plate 2.

in the case that the injection molding die halves are mold-closed, the movable molding die half 1 is moved to the fixed molding die half 7 in such a manner that both the central axes of the halves perpendicular to the molding surfaces are coincide with each other and then a movable guiding ring (not shown) abuts and fits onto a fixed ring (not shown) so as to be aligned with each other and mold-clamped. As a result, the cavity 12 for the disc substrate is defined between the stamper 4 mounded on the movable mirror face plate 2 and the fixed mirror face plate 8.

In the mold-closed status of the injection molding die, a cylinder of the injection molding device (not shown) is connected to the center of the sprue bushing 9 and then a heated molten material is injected through the sprue bushing 9 into the cavity 12 so that the molten material flows from the central portion towards the outer peripheral in the cavity 12.

When the molten material is cooled, the information pattern formed on the surface of the stamper 4 is transferred to the surface of a disc substrate.

Subsequently, the fixed bushing 10 and the cut-punch 6 in cooperation cut off the unnecessary portion of the hardened material. After that, the movable molding die half 1 is separated from the fixed molding die half 7, so that the injection molding die is mold-opened and then the disc substrate extruded from the die.

The disc substrate formed by means of the injection molding die of an embodiment according to the invention comprises the first circular surface including the inner non-data region having the stack-rib of the circular protrusion and the opposite side or the second circular surface being flat. In other words, this disc substrate inject-molded comprises; a first circular surface having the inner non-data region formed around a center hole thereof and the outer data region formed around the non-data region; a second circular flat surface opposite and parallel to the first circular surface; and a ring shaped stack-rib formed on the non-data region.

Figure 2:
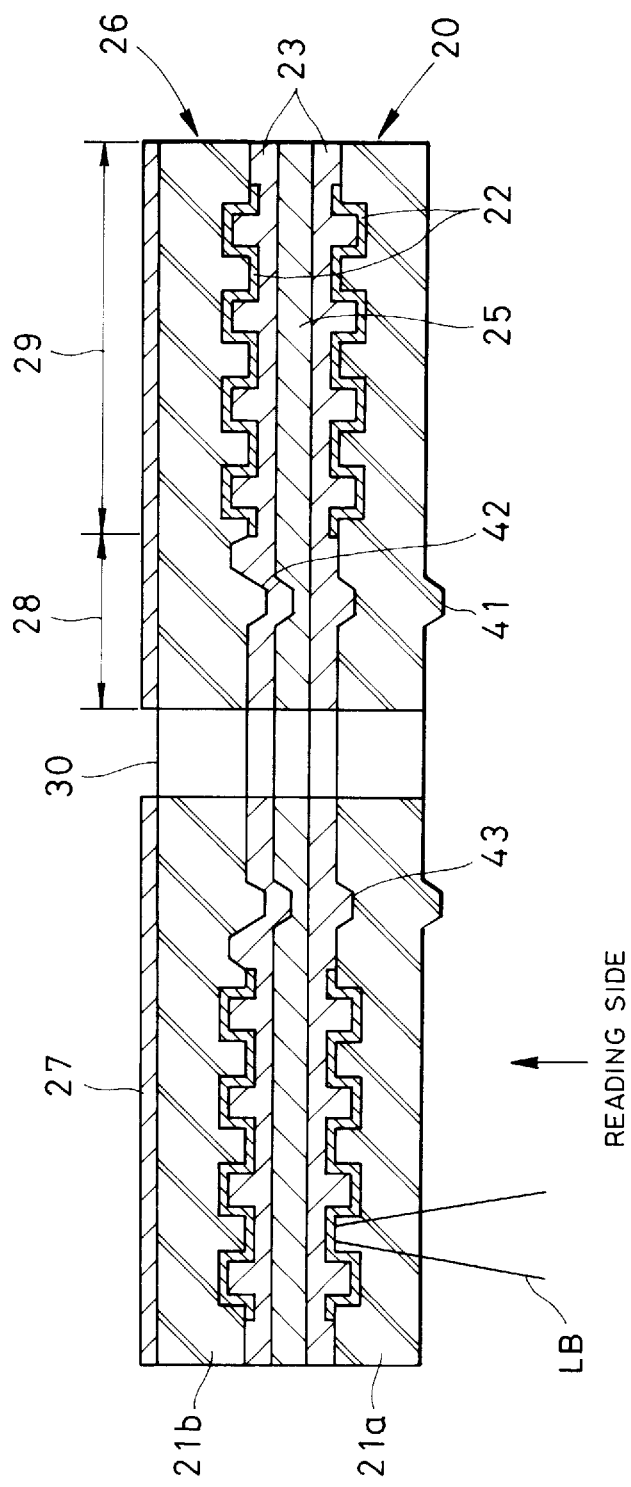
FIG. 2 is a cross-sectional view showing a two-layer type disc substrate of an embodiment according to the invention.
Figure 3:
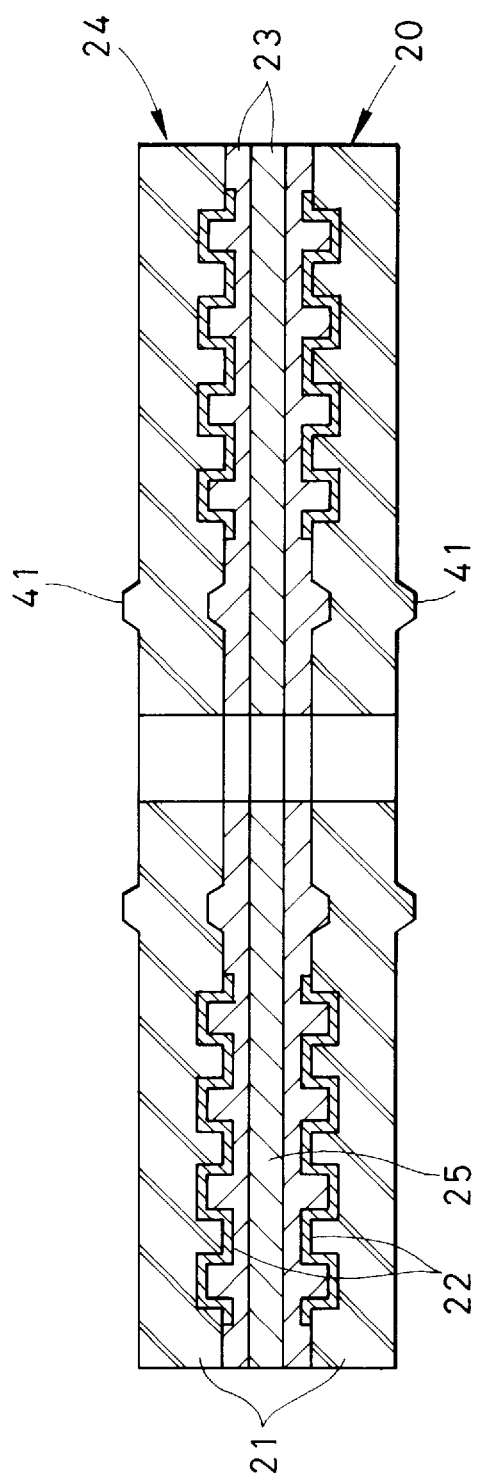
FIG. 3 is a cross-sectional view showing a conventional pasted type optical disc.

FIG. 2 shows a cross-sectional view showing a two-layer type disc substrate of an embodiment according to the invention in which the first disc substrate 20 is formed by means of the conventional injection molding die and the second disc substrate 26 is formed by means of the injection molding die of an embodiment according to the invention which are pasted to each other.

The a first disc substrate 20 for carrying the information signal which comprises a light-transmissible substrate 21a with a signal-recorded surface carrying pits corresponding to the signal to be recorded and a reflective layer 22 made of a metal thin film covering the first signal-recorded surface in the outer data region 29. A protective layer 23 made of an UV-radiation-curable resin is formed at a predetermined thickness on the reflective layer 22. The first disc substrate 20 has the stack-rib 41 on the opposite side to the signal-recorded surface in the inner non-data region 28.

In addition, the numeral 26 denotes a second disc substrate. This second disc substrate 26 comprises a light-transmissible substrate 21b with a dummy signal-recorded surface which carries dummy pits corresponding to dummy signals and a reflective layer 22 made of a metal thin film covering the dummy signal-recorded surface in the outer data region 29. A protective layer 23 made of an UV-radiation-curable resin is formed at a predetermined thickness on the reflective layer 22.

Figure 4:
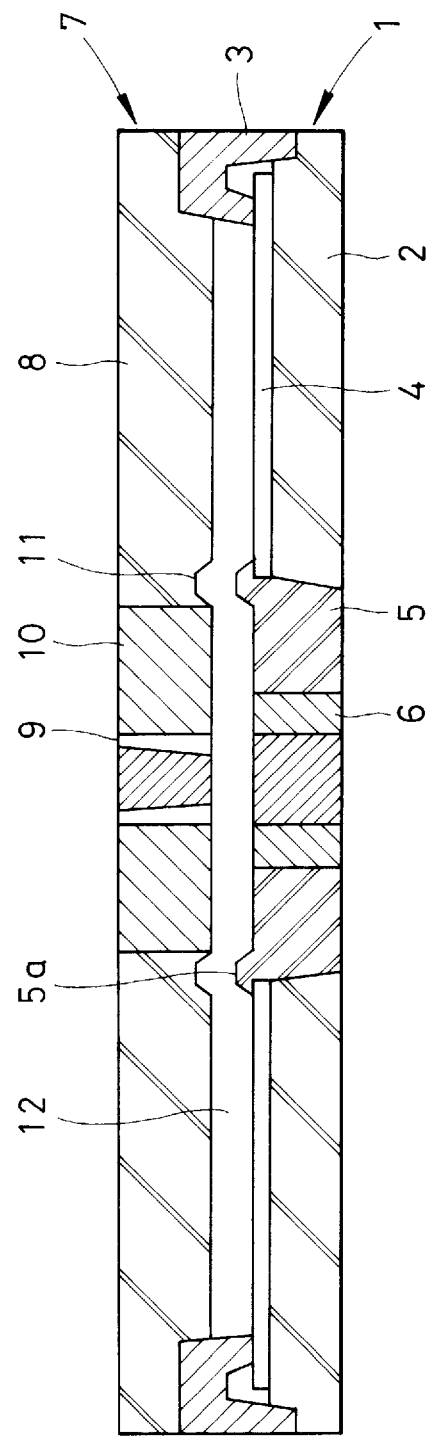
FIG. 4 is a cross-sectional view showing a conventional injection molding die.

The light-transmissible substrate 21b or the second disc substrate 26 inject-molded according to the invention comprises; the first circular surface to be pasted having the inner non-data region 28 formed around a center hole thereof and the outer data region 29 formed around the non-data region; a second circular flat surface opposite and parallel to the first circular surface; and a ring shaped stack-rib 42 formed on the non-data region, in which the first circular flat surface is adhered via an adhesive layer to the first disc substrate. Thus, the printed region 27 is formed on the flat surface of the second disc substrate 26 by means of the off-set printing or screen printing. In addition, the light-transmissible substrate 21a of the first disc substrate 20 is provided with a receipt groove 43 disposed correspondingly to the stack-rib 42 of the light-transmissible substrate 21b on the side to be pasted thereof. This receipt groove 43 may be formed by the holding edge 5a of the inner circumference holding ring 5 in the injection molding die shown in FIG. 4.

Finally, these first and second disc substrates 20 and 26 pasted with an adhesive such as the hot melt adhesive, the UV-radiation-curable resin type adhesive or the like in such a manner that both the protective layers 23 sandwich the adhesive layer 25, so that the pasted type optical disc is fabricated.

As shown in FIG. 2, in the pasted type optical disc above mentioned, a laser beam LB is irradiated onto through the light-transmissible substrate 21a of the first disc substrate 20 to the signal-recorded surface thereof and then the reflected light is detected to reproduce the recorded information signal.

In addition to the above embodiment of the single-sided recording pasted type optical disc in which the first information signal is recorded to the first disc substrate 20 and, the dummy signal is recorded to the second disc substrate 26, the invention may be achieves a double-sided recording pasted type optical disc in which a second information signal is recorded to the second disc substrate 26 instead of the dummy signal. In other words, this type optical disc has the first and second signal-recorded surfaces of the first and second disc substrates.

In this case, the protective layer 23 and the adhesive layer 25 are formed by materials having transparency for the incident light (e.g., the UV-radiation-curable resin) respectively and, moreover, the first signal-recorded surface of the first disc substrate is formed by a semitransparent material for the incident light which partially reflects and transmits the incident light. This semitransparent first signal-recorded surface may be formed by a reflective layer of a metallic thin film deposited by a vacuum vapor or sputtering deposition.

In this optical disc, a recorded signal is read on the basis of a reflected light from an optical spot on the first or second signal-recorded surface of the converged incident light beam irradiated through the first disc substrate.

In addition to the above embodiment in which the protective layers are formed on the reflective layers of the first and second discs respectively and then the protective layer sides thereof are pasted each other, the pasted type disc of the invention may be formed in such a manner that the reflective layers of the first and second disc substrates are pasted each other via the adhesive layer without forming any protective layer.

According to the invention, the disc substrate having the inner non-data region and the outer data region is characterized in that the non-data region has the stack-rib and the opposite side surface is flat. Therefore, each signal-recorded surface of the stacked disc substrates do not suffer any damage and each can obtain at the flat surface a large area of the printed region being readily printed without any restrict of the kind of the printing machine.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. An injection-molded disc substrate for a laminated optical disc comprising:

a first circular surface having an inner non-data region formed around a center hole thereof and an outer data region formed around said non-data region;

a second circular surface being entirely flat, opposite and parallel to said first circular surface; and a ring shaped stack-rib formed on said inner non-data region of the first circular surface having the inner non-data region.

2. A disc substrate molding die for injection-molding a disc substrate for a laminated optical disc comprising:

a pair of first and second molding die halves each having a circular molding surface for defining a disc cavity for a disc substrate by facing each other in a mold-clamped status thereof;

an inner circumference holding ring with a holding edge for holding an inner circumference edge of a stamper provided on the molding surface of the first molding die half for defining a first circular surface of the disc substrate having an inner non-data region and an outer data region formed around said non-data region;

a mirror face plate being entirely flat for defining a second circular surface opposite and parallel to said first circular surface of the disc substrate and formed on the molding surface of the second molding die half;

an injection means for injecting a molten material into a center of the disc cavity;

a cutting means for cutting a hardened material disposed inside of the holding ring adjacent to the center of the disc cavity; and a circular groove for forming a stack-rib on the inner non-data region of the first circular surface of the disc substrate and formed on the molding surface of the first molding die half between the holding edge and the cutting means.

3. An optical disc comprising:

a first injection-molded disc substrate of a transparent material through which a light beam is irradiated;

a second disc substrate inject-molded comprising a first circular surface having an inner non-data region formed around a center hole thereof and an outer data region formed around said non-data region; a second circular surface being entirely flat, opposite and parallel to said first circular surface; and a ring shaped stack-rib formed on said inner non-data region of the first circular surface, wherein said first circular flat surface is adhere via an adhesive layer to the first disc substrate; and a printed region formed on the second circular flat surface of the second disc substrate.

4. An optical disc according to claim 3, further comprising a first signal-recorded surface formed on the first disc substrate at the adhered side to the adhesive layer.

5. An optical disc according to claim 4, further comprising a second signal-recorded surface having a high reflectivity for an incident light being formed on the first circular surface of the second disc substrate; characterized by the first signal-recorded surface having a semitransparency for the incident light which partially reflects and transmits the incident light; and characterized by the adhesive layer having a transparency for the incident light, whereby a recorded signal is read on the basis of a reflected light from an optical spot on the first or second signal-recorded surface of the converged incident light beam irradiated through the first disc substrate.

* * * * *